(12) United States Patent
Heuver

(10) Patent No.: US 11,009,119 B2
(45) Date of Patent: May 18, 2021

(54) ELECTRIC MACHINE AND METHOD FOR MANUFACTURE OF AN ELECTRIC MACHINE

(71) Applicant: Ford Global Technologies, LLC, Dearborn, MI (US)

(72) Inventor: Bradley Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 16/274,715

(22) Filed: Feb. 13, 2019

(65) Prior Publication Data

US 2020/0256457 A1 Aug. 13, 2020

(51) Int. Cl.

| F16H 55/18 | (2006.01) |
| F16H 57/12 | (2006.01) |
| F16D 3/12 | (2006.01) |
| H02P 21/18 | (2016.01) |
| H02P 21/22 | (2016.01) |
| F16D 3/52 | (2006.01) |
| F16D 1/10 | (2006.01) |

(52) U.S. Cl.
CPC ............ *F16H 57/12* (2013.01); *F16D 3/12* (2013.01); *F16D 3/52* (2013.01); *H02P 21/18* (2016.02); *H02P 21/22* (2016.02); *F16D 2001/103* (2013.01); *F16H 2057/127* (2013.01); *H02P 2207/05* (2013.01)

(58) Field of Classification Search
CPC ............ F16H 57/12; F16H 2057/126; F16H 2057/127; H02P 21/18; H02P 21/22; H02P 2207/05; F16D 1/101; F16D 1/12; F16D 3/12; F16D 3/52; F16D 3/64; F16D 2001/103

See application file for complete search history.

(56) References Cited

U.S. PATENT DOCUMENTS

| 2,806,365 | A | * | 9/1957 | Hennig | ................. F16D 3/64 464/74 |
| 4,212,380 | A | * | 7/1980 | Billet | ............... F16F 15/1238 192/213.22 |
| 5,117,959 | A | * | 6/1992 | Graton | ............... F16F 15/129 192/213.22 |
| 6,474,428 | B1 | | 11/2002 | Fujikawa et al. | |
| 6,492,742 | B1 | | 12/2002 | Fujikawa et al. | |
| 7,534,171 | B2 | * | 5/2009 | Braford, Jr. | ........... F16D 3/66 464/74 |
| 8,376,649 | B2 | * | 2/2013 | Heinrich | ............. F16D 21/06 403/359.4 |

(Continued)

FOREIGN PATENT DOCUMENTS

| DE | 102018109473 A1 * | 9/2019 | ............ F16D 1/10 |
| FR | 2270491 A2 * | 12/1975 | ......... F16F 15/1238 |

*Primary Examiner* — Adam D Rogers
(74) *Attorney, Agent, or Firm* — David Kelley; McCoy Russell LLP

(57) ABSTRACT

An electric machine and method for operating an electric machine are provided. The electric machine includes a first rotational component and a second rotational component rotationally engaging the first rotational component via a splined interface. The electric machine further includes a first lash reducing spring radially positioned between a first set two adjacent splines in the splined interface.

17 Claims, 5 Drawing Sheets

(56) References Cited

U.S. PATENT DOCUMENTS

| | | | |
|---|---|---|---|
| 8,839,922 B2* | 9/2014 | Ideshio | B60K 6/40 |
| | | | 192/3.25 |
| 9,579,965 B2* | 2/2017 | Frait | B60K 6/48 |
| 2018/0062469 A1 | 3/2018 | Satyaseelan et al. | |
| 2018/0306134 A1 | 10/2018 | Uhrich et al. | |
| 2020/0238813 A1* | 7/2020 | Heuver | H02K 7/006 |

\* cited by examiner

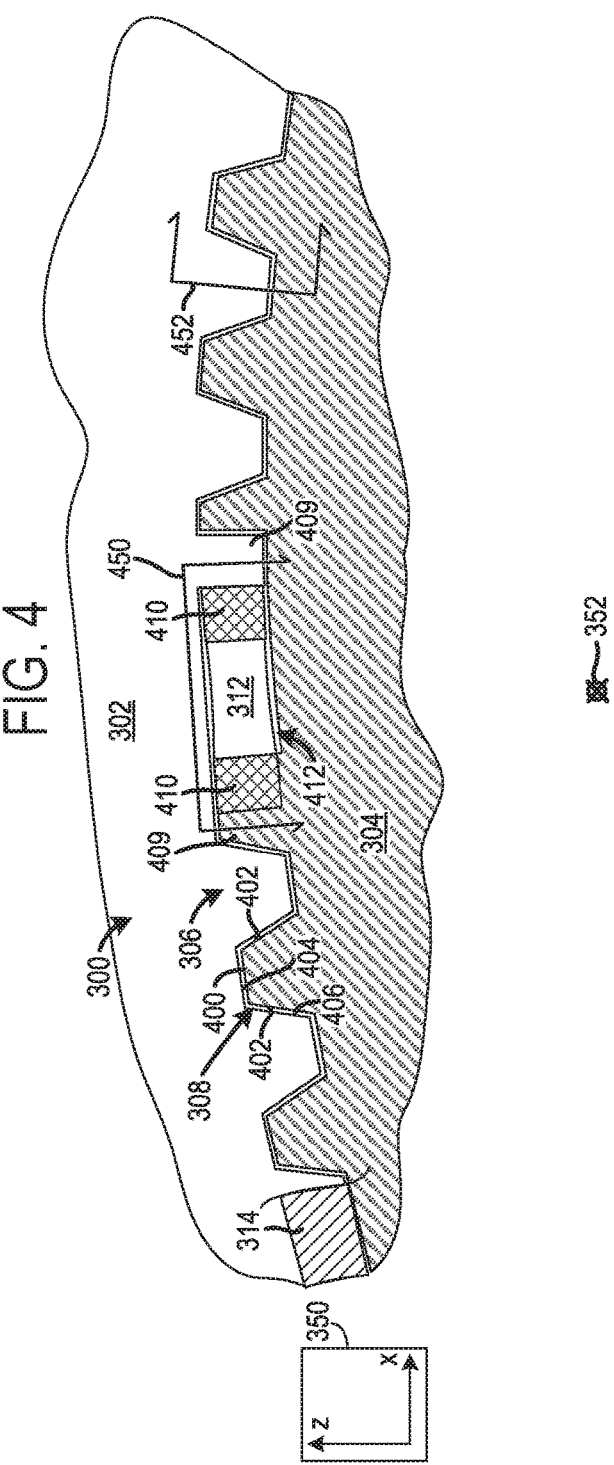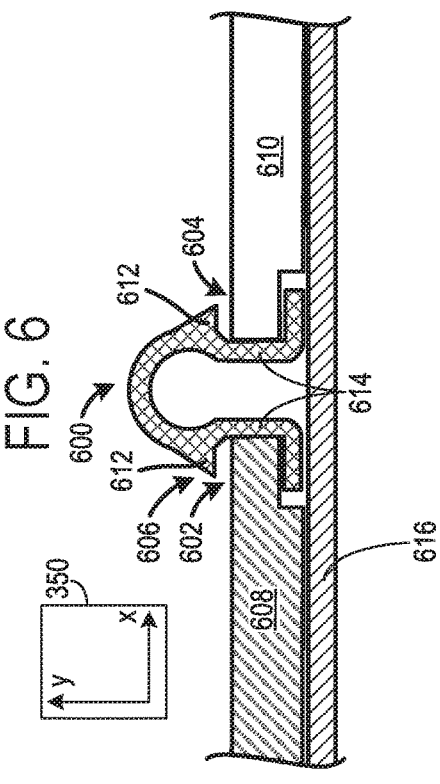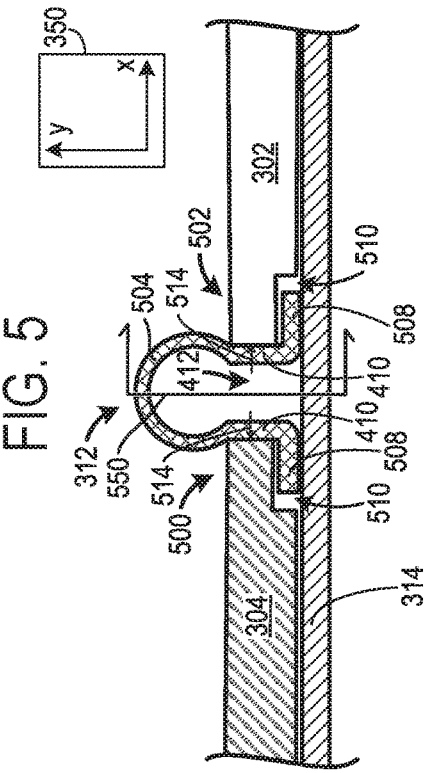

ELECTRIC MACHINE AND METHOD FOR MANUFACTURE OF AN ELECTRIC MACHINE

FIELD

The present description relates generally to an electric machine in a driveline system and method for manufacture of an electric machine.

BACKGROUND/SUMMARY

Certain types of hybrid vehicles introduce rotational energy from electric motors into vehicle drivelines using a torque converter. In these motors, rotor carriers are rotationally coupled to torque converters as well as rotor hubs to facilitate efficient rotor rotation, during motor operation. Furthermore, some electric motors, such as permanent magnet synchronous motors (PMSM), utilize signal feedback from a sensor, such as a resolver, to control electromagnetic operation in the motor. In certain circumstances, dedicated integrated circuits (ICs) are employed to process resolver signals.

One example approach is shown by Satyaseelan et al., in U.S. 2018/0062469 A1. Satyaseelan's system uses a Belleville spring to retain a rotor to a rotor hub. However, Applicant have recognized several drawbacks with Satyaseelan's system. For instance, the motor in Satyaseelan relies on axial clamping forces to reduce lash in the splined interface between the rotor hub and the rotor. However, clamping forces generated by the Belleville spring may not be sufficient, in certain circumstances, to provide a desired clamping strength between the rotor hub and the rotor to reduce lash. As a result, the interface between the rotor and the rotor hub may experience unwanted lash, which in turn decreases machine durability due to impacts between the splines in the interface and ultimately drives down the motor's lifespan. Additionally, the lash may decrease the accuracy of signals from the motor's resolver, decreasing motor efficiency. Additionally, it will be appreciated that incorporating a Belleville washer into a space limited motor also introduces a number of packaging challenges and may cause unwanted design changes to adjacent components or may increase the motor's overall profile.

In one example, the issues described above may be at least partially addressed by an electric machine including a first rotational component (e.g., rotor carrier) engaging a second rotational component (e.g., rotor hub) via a splined interface. The electric machine further includes a first lash reducing spring radially positioned between a first set of two adjacent splines in the splined interface. In this way, the lash in the machine's splined interface is substantially reduced using a robust and space efficient spring loading mechanism. Additionally, directly spring loading the splines using a spring mechanisms also allows for increased lash reduction in the splined interface when compared to a Belleville washer axially preloading a splined interface. As a result, the electric machine's longevity is increased due to a decrease in spline degradation caused by impacts between the splines and other factors.

In one example, the electric machine may further include a sensor (e.g., a resolver) coupled to the second rotational component (e.g., rotor hub) and designed to generate a signal indicative of speed and/or position of the electric machine's rotor. Due to the lash reduction between the splines, accuracy of the sensor signal is drastically increased. In particular, electromagnetic (EM) modulation in the machine's stator may be more accurately controlled to increase motor efficiency, output, etc.

Further, in one example, the electric machine may include a second lash reducing spring positioned between a second set of two adjacent splines in the splined interface. The first and second lash reducing springs may be positioned on radially opposing sides of the splined interface to balance rotational loading on the rotor bearing. As a result, the likelihood of bearing degradation caused by imbalanced rotational loading is considerably reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a detailed view of the splined interface and lash reducing spring, illustrated in FIG. 3.

FIG. 5 shows a cross-sectional view of the splined interface and lash reducing spring, depicted in FIG. 4.

FIG. 6 shows another example of a lash reducing spring in a splined interface.

FIG. 2 is drawn approximately to scale. However, other relative dimensions may be used, in other embodiments.

DETAILED DESCRIPTION

The following description relates to a lash reducing spring placed between abutting splines in an interface formed between two rotating components in an electric motor or other suitable electric machine. As described herein lash is defined as a clearance between mated components. The lash reducing spring serves to reduce lash in the electric motor. The likelihood of electric motor degradation caused by repeated stresses during machine transients caused by lash in the interface is therefore reduced, thereby increasing machine longevity and durability. Reducing lash in the splined interface also increases the accuracy of signals from sensors integrated into or coupled (e.g., indirectly or directly coupled) to the machine, such as resolvers. Therefore, in one example, the accuracy of a signal from a resolver coupled to the rotor hub is increased when the lash reducing spring is employed. The increased signal accuracy results in increased electric motor operational efficiency brought about by a more accurate resolver signal, and which may in some cases require less signal processing. For example, electric motor stator control can be more accurately controlled to increase motor efficiency, increase motor speed, etc., due to the increased signal accuracy, if desired. In one example, the resolver may be able to report rotor position with a resolution of less than $1/10^{th}$ of a degree when lash is reduced in the splined interface via the lash reducing spring. It will be appreciated that when the splined interface includes an amount of lash greater than an acceptable value, as is the case in previous electric machine designs, a desired resolver accuracy may not be achieved. Placing a spring directly between splines in a rotational coupling in the motor also allows for space efficiency gains when compared to motors using Belleville springs exerting an axial load on a rotational interface. Thus, the machine may be packaged in a more space efficient manner, when compactness resides on the list of design goals.

Figure 1:
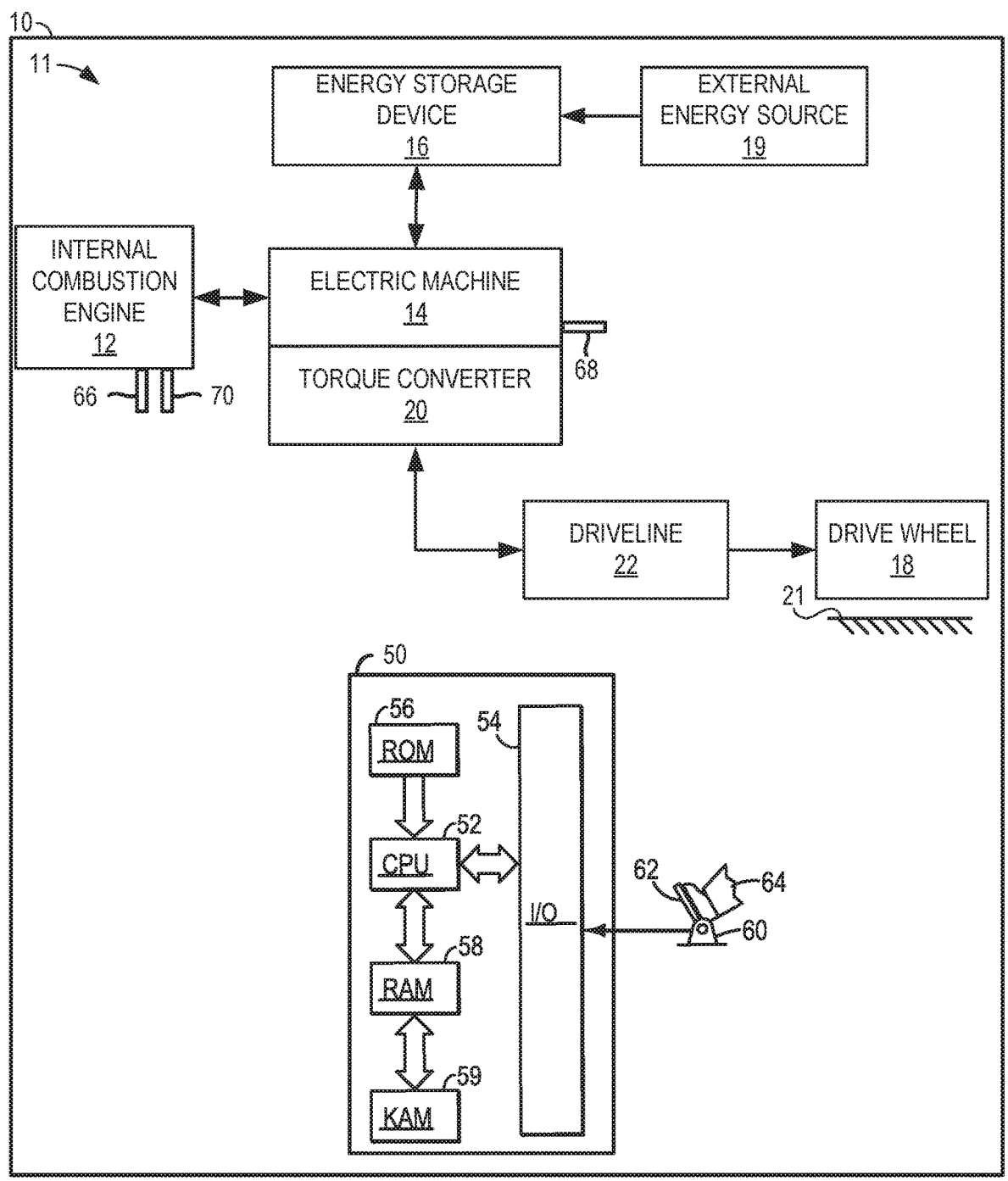
FIG. 1 shows a schematic depiction of a vehicle including an electric machine and internal combustion engine.
Figure 3:
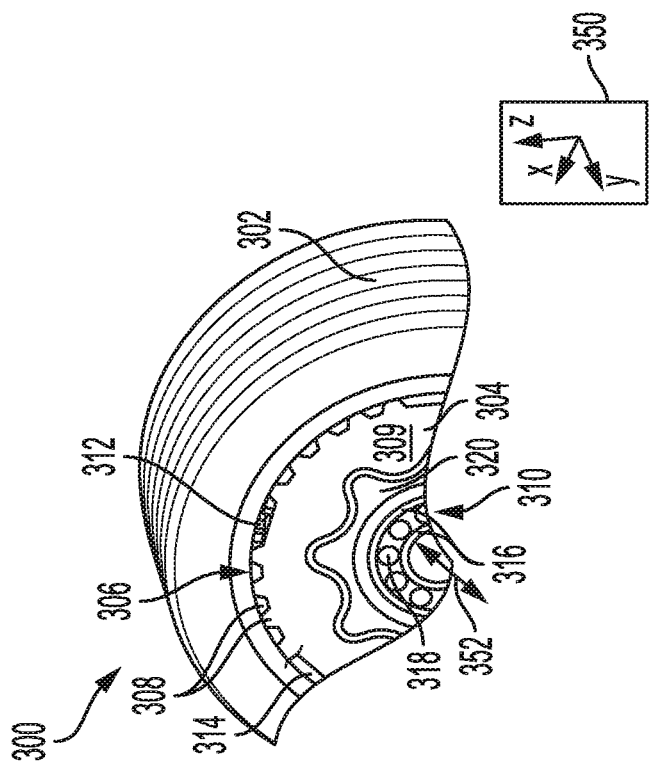
FIG. 3 shows another example of an electric machine including a splined interface with a lash reducing spring.
Figure 2:
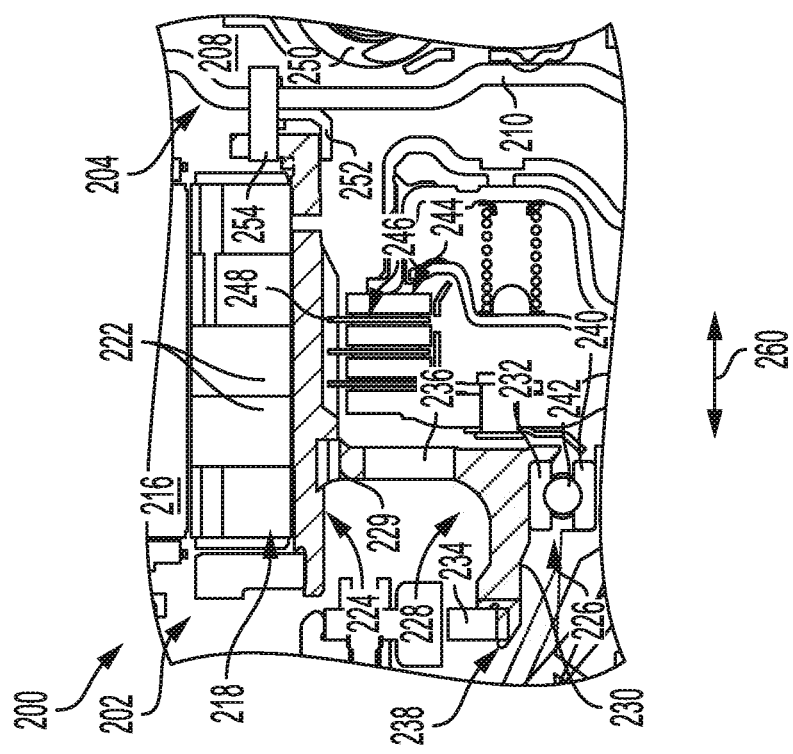
FIG. 2 shows an example of an electric machine including a splined interface.
Figure 9:
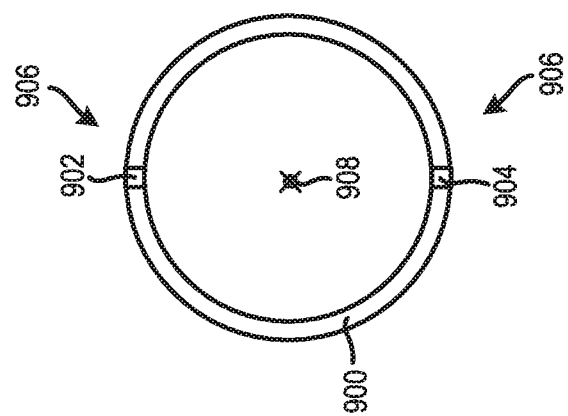
FIG. 9 shows another example of a splined interface including two lash reducing springs.
Figure 10:
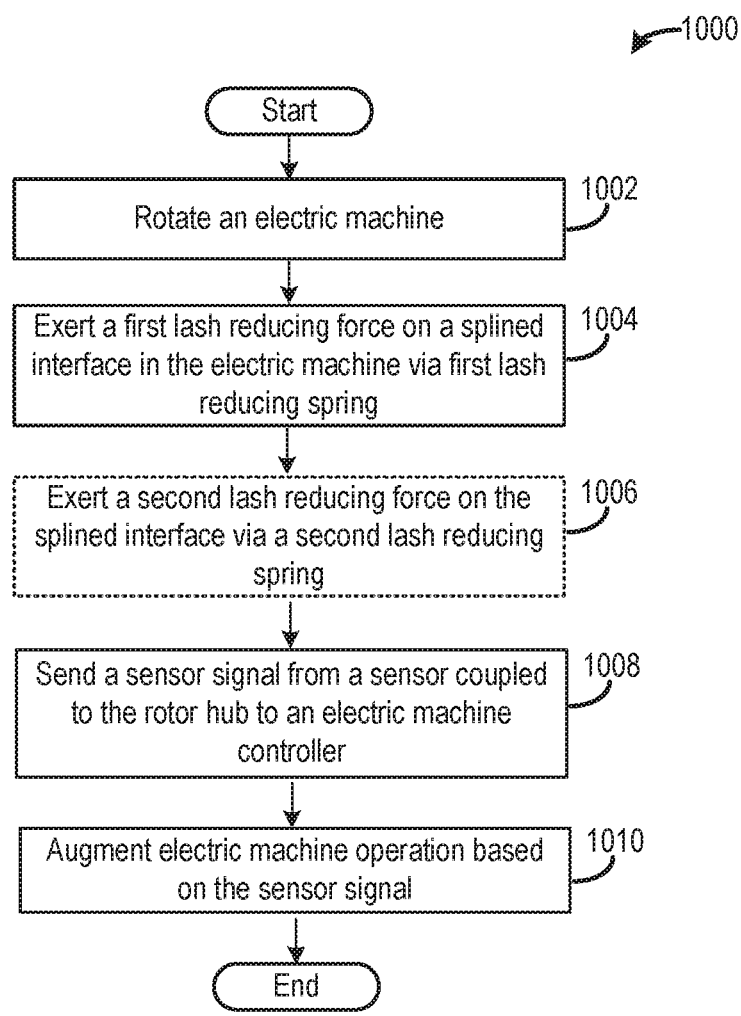
FIG. 10 shows a method for operation of an electric machine.

FIG. 1 shows a schematic depiction of a vehicle with a propulsion system having an electric machine. FIG. 2 shows a cross-sectional illustration of an example of an electric machine with a splined interface. FIG. 3 shows a perspective view of second example of an electric machine with a splined interface having a lash reducing spring in the interface. FIGS. 3-8 show different cross-sectional view of portions of the electric machine, shown in FIG. 3, illustrating the space efficient and robust arrangement of the lash reducing spring. FIG. 9 shows an example of a splined interface in an electric machine with two radially opposing lash reducing springs. FIG. 10 shows a method for operation of an electric machine for reducing lash in the machine and for increasing accuracy of in the machine's resolver signal.

Referring to FIG. 1, the figure schematically depicts a vehicle 10 with a propulsion system 11 (e.g., hybrid propulsion system). Propulsion system 11 includes an internal combustion engine 12. The internal combustion engine 12 is coupled to an electric machine 14 (e.g., energy conversion device).

The electric machine 14 is further shown coupled to an energy storage device 16, which may include a battery, a capacitor, a flywheel, a pressure vessel, etc. The electric machine 14 can be operated to absorb energy from vehicle motion and/or the engine and convert the absorbed energy to an energy form suitable for storage by the energy storage device (e.g., provide a generator operation). The electric machine 14 can also be operated to supply an output (power, work, torque, speed, etc.,) to drive wheels 18 and/or engine 12 (e.g., provide a motor operation). It should be appreciated that the electric machine 14 may, in some embodiments, function only as a motor, only as a generator, or both a motor and generator, among various other components used for providing the appropriate conversion of energy between the energy storage device and the vehicle drive wheels and/or engine. For instance, the electric machine 14 may include a motor, a generator, integrated starter generator, starter alternator, among others and combinations thereof.

The electric machine 14 may include one or more clutches designed to selectively rotationally couple the machine's rotor to a crankshaft (not shown) of the engine 12 and/or the torque converter 20. For instance, the clutch or clutches may each include plates, splines, and/or other suitable mechanical components allowing the machine to be rotationally connected as well as disconnected from the engine or the torque converter.

The energy storage device 16 may be selectively coupled to an external energy source 19. For example, the energy storage device 16 device may be periodically coupled to a charging station (e.g., commercial or residential charging station), portable energy storage device, etc., to allow the energy storage device 16 to be recharged.

The electric machine 14 is coupled to a torque converter 20. The torque converter 20 is a fluid coupling designed to transfer rotational input from the electric machine 14 and/or the internal combustion engine 12 to a driveline 22. The driveline 22 includes a transmission with gearing and other suitable mechanical components designed to transfer rotational motion to the drive wheels 18. The mechanical components may include a gearbox, axles, transfer cases, etc., for example. The torque converter 20 and the electric machine 14 are depicted as an interconnected unit. However, in other examples, the torque converter and the electric machine may include discrete enclosures.

In one example, a crankshaft of the engine may be coupled to an input of the electric machine and a shaft of the torque converter 20 may be attached to a transmission input. However, other driveline designs have been contemplated.

The depicted connections between engine 12, electric machine 14, driveline 22, and drive wheel 18 indicate transmission of mechanical energy from one component to another, whereas the connections between the electric machine 14 and the energy storage device 16 may indicate transmission of a variety of energy forms such as electrical, mechanical, etc. For example, torque may be transmitted from the electric machine 14 to drive the vehicle drive wheels 18 via the driveline 22. As described above, the electric machine 14 may be configured to operate in a generator mode and/or a motor mode. In a generator mode, system 11 absorbs some or all of the output from engine 12 and/or electric machine 14, which reduces the amount of drive output delivered to the drive wheel 18, or the amount of braking torque to the drive wheel 18. Such operation may be employed, for example, to achieve efficiency gains through regenerative braking, increased engine efficiency, etc. Further, the output received by the electric machine may be used to charge an energy storage device 16. In motor mode, the electric machine 14 may supply mechanical output to the driveline 22, for example by using electrical energy stored in an electric battery. Additionally, the engine 12 may supply rotational output to the driveline 22 during the motor mode, in some instances.

Hybrid propulsion embodiments may include full hybrid systems, in which the vehicle can run on just the engine, just the electric machine (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components, described above with reference to FIG. 1, may be controlled by a vehicle controller 50, described in greater detail herein.

From the above, it should be understood that the exemplary hybrid propulsion system is capable of various modes of operation. In a full hybrid implementation, for example, the propulsion system may operate using electric machine 14 as the only torque source propelling the vehicle. This "electric only" mode of operation may be employed during braking, low speeds, while stopped at traffic lights, etc. In another mode, engine 12 is turned on, and acts as the only torque source powering drive wheel 18 on a drive surface 21. In still another mode, which may be referred to as an "assist" mode, the electric machine 14 may supplement and act in cooperation with the torque provided by engine 12. As indicated above, electric machine 14 may also operate in a generator mode, in which torque is absorbed from engine 12 and/or driveline 22. Furthermore, electric machine 14 may act to augment or absorb torque during transitions of engine 12 between different combustion modes (e.g., during transitions between a spark ignition mode and a compression ignition mode).

FIG. 1 also shows a controller 50 in the vehicle 10. The controller 50 receives signals from the various sensors of FIG. 1 and employs the various actuators of FIG. 1 to adjust vehicle operation based on the received signals and instructions stored in non-transitory memory of the controller. The electric machine, shown in FIGS. 2-6, may also be controlled by the vehicle controller 50. Specifically, controller 50 is shown in FIG. 1 as a conventional microcomputer including: microprocessor unit 52, input/output ports 54, read-only memory 56, random access memory 58, keep alive memory 59, and a conventional data bus. Controller 50 is configured to receive various signals from sensors coupled to the propulsion system 11 and send command signals to actuators in components in the vehicle, such as the electric machine 14. Additionally, the controller 50 is also configured to receive pedal position (PP) from a pedal position sensor 60 coupled to a pedal 62 actuated by an operator 64. Therefore, in one example, the controller 50 may receive a pedal position signal and adjust actuators in the electric machine 14 based on the pedal position signal to vary the rotational output of the electric machine 14. It will be appreciated that other components receiving command signals from the controller may function in a similar manner such as the engine 12. The sensors communicating with the controller 50 may include an engine speed sensor 66, electric machine sensor 68 (e.g., resolver), and engine temperature sensor 70, etc.

In one example, the controller 50 may be designed to initiate electric machine 14 rotation. During the rotation a lash reducing spring positioned in the splined interface 229 exerts a preload force on splines in the interface to reduce lash. Examples of the lash reducing spring are shown in FIGS. 3-9 and discussed in greater detail herein.

In another example, the controller 50 may be designed to receive signals indicative of electric machine rotor speed and/or position from the sensor 68 (e.g., resolver). Responsive to receiving the signal. Furthermore, the controller may be designed to process the resolver signal. Additionally, the controller 50 may be designed to augment electric machine 14 operation based on the signal received from the sensor 68. In one use-case example, the resolver may report the position of the rotor and its magnetic field back to the controller in real time or near real time with a predetermined accuracy (e.g., an accuracy of +/−0.18 degrees). When lash between the resolver and the rotor exceeds a threshold it may preclude the machine from achieving the predetermined level of accuracy. Consequently, failing to reduce lash may have negative impacts in the machine's efficiency. As such, it is desirable to reduce (e.g., substantially eliminate) lash in in the splined interface. It will be appreciated that reducing lash also increases the machine's durability due, for example, to the reduction in impacts between the splines.

FIG. 2 shows a cross-sectional view of an example electric machine 202 in a driveline system 200. FIG. 2 also shows a torque converter 204 rotationally coupled to the electric machine 202. The electric machine 202 and the torque converter 204, shown in FIG. 2, serve as an example of the electric machine 14 and the torque converter 20, shown in FIG. 1. It will also be appreciated that various structural and functional aspects of the different electric machines described herein may be combined to form other electric machine embodiments having other combinations of machine characteristics.

The electric machine 202 is rotationally coupled to a crankshaft (not shown) of an engine, such as the engine 12, shown in FIG. 1. The electric machine 202 may transfer rotational energy to a driveline, such as the driveline 22 shown in FIG. 1, during a drive mode. On the other hand, during an energy absorption mode, the electric machine 202 may also receive rotational energy from an engine, such as the engine 12, shown in FIG. 1, and/or a driveline and convert the rotational energy into electric energy.

The torque converter 204 is also shown rotationally coupled to the electric machine 202. The torque converter 204 is configured to transfer rotational energy to downstream components (e.g., the driveline). To achieve the rotational energy transfer functionality the torque converter 204 includes a hydraulic chamber 208 enclosed via a housing 210 and other suitable mechanical components for achieving the rotational energy transfer.

The electric machine 202 includes a stator 216 and a rotor 218. The stator 216 electromagnetically interacts with the rotor 218 to provide the previously described rotational energy generation and absorption functionality. Specifically, in a drive mode the stator 216 electromagnetically interacts with the rotor 218 to cause rotation of the rotor. In an energy recovery mode the stator 216 electromagnetically interacts with the rotor 218 to generate electrical energy in the stator 216. Thus, the stator 216 may transfer electrical energy to or receive electrical energy from an energy storage device, such as the energy storage device 16, shown in FIG. 1, depending on the mode of operation. The stator 216 at least partially circumferentially encloses the rotor 218, in the depicted example. However, other arrangements between the rotor and the stator have been contemplated.

The rotor 218 includes a plurality of laminated rotor sections 222 (e.g., axially laminated rotor sections), in the illustrated example. The laminated rotor sections 222 of the rotor 218 may be attached (e.g., clamped) to a rotor carrier 224. The laminated rotor sections 222 provide the aforementioned electromagnetic interaction with the stator 216 during operation of the electric machine 202. However, other rotor configurations have been envisioned, such as configuration where laminated sections are not utilized.

The rotor carrier 224 functions as a rotational support for the rotor 218. To achieve the rotational functionality, the rotor carrier 224 is coupled to a rotor bearing 226 via a rotor hub 228. A rotational axis 260 about which the rotor 218 and other components in the electric machine rotate is provided, for reference.

A splined interface 229 is formed between the rotor carrier 224 and the rotor hub 228. The splined interface 229 includes a plurality of mated splines allowing rotational energy to be transferred between the components. The splined interface 229 also may have a spring positioned between sequential splines to reduce lash in the interface. The spring loading feature of the interface is described in greater detail herein with regard to FIGS. 3-9.

The rotor hub 228 is L-shape in its cross-section, in the depicted example, and functions as a support leg to allow for rotational coupling between the rotor carrier 224 and the rotor bearing 226. Thus, a first section 230 axially extends from an outer race 232 of the rotor bearing 226. Additionally, a second section 236 radially extends from the outer race 232. In one example, the first and/or second section of rotor hub may extend circumferentially around the rotational axis of the machine 202. However, other rotor hub shapes have been contemplated, such as annular shapes, cylindrical shapes, shapes with discrete sections that do not entirely circumferentially surround the rotational axis of the machine, etc.

A sensor 234 (e.g., resolver) is coupled to the rotor hub 228. Specifically, in the illustrated example, the sensor 234 is coupled to a distal end 238 of the first section 230 of the rotor hub 228. However, in other examples, the sensor 234 may be attached to the rotor hub 228 at other locations, such as at other locations in the first section 230 or the second section 236.

The rotor hub 228 may be formed in one continuous piece, to strengthen hub. However, in other examples, the support leg and rotor carrier may be separate components coupled to one another.

Additionally, the bearing 226 includes an inner race 240 and roller elements 242 to achieve rotational functionality. The roller elements may be spherical, cylindrical, conical, etc.

FIG. 2 also shows a clutch assembly 244 including a clutch plate 246 configured to be rotationally coupled and decoupled from the crankshaft 206 and from the rotor 218. In this way, the clutch functions to connect and disconnect the electric machine from the engine. In one example, the clutch assembly 244 may be a KO clutch. However, other suitable types of clutches have been envisioned. The clutch plate 246 may be engaged with the rotor carrier 224 when in driving engagement. For instance, the clutch plate 246 and the rotor carrier 224 may each include splines 248 mated with one another when the clutch assembly is in driving engagement. However, when the clutch assembly 246 is disengaged, the clutch plate 246 may be uncoupled from the rotor carrier 224. For instance, the splines 248 in the clutch plate 246 and the rotor carrier 224 may be decoupled from one another when the clutch assembly 244 is disengaged. However, other clutch configurations allowing for rotor engagement/disengagement have been envisioned.

The torque converter 204 may include a damper assembly 250, as shown in FIG. 2. The damper assembly 250 is designed to attenuate torque transmitted to the torque clutch in the torque converter 204. For instance, fluid chambers, springs, other suitable mechanical components, etc., may be used to achieve the dampening functionality. However, in other examples, the damper assembly may be omitted from the torque converter.

The driveline system 200 further includes a torque converter drive plate 252. The torque converter drive plate 252 is shown in FIG. 2 coupled (e.g., fixedly coupled) to the rotor carrier 224. As shown, an attachment apparatus 254 extends through the rotor carrier 224 and the torque converter drive plate 252 to form a rotational coupling. In this way, fixed attachment may be formed between the rotor carrier 224 and the drive plate 252. The attachment apparatus 254 also extends through the torque converter housing 210 to attach the drive plate 252 to the torque converter 204. However, numerous suitable attachment techniques between the torque converter 204, the rotor carrier 224, and/or the torque converter housing 210 have been contemplated.

It will be appreciated that rotational energy may be transferred from the rotor 218 to the rotor carrier 224 and then to the torque converter 204 via the drive plate 252. However, other energy transfer paths in the machine may be utilized, in other examples.

FIG. 3 shows a perspective view of an example of an electric machine 300. It will be appreciated that the electric machine 300, depicted in FIG. 3, is an example of the electric machine 14, shown in FIG. 1. It will also be appreciated that various aspects of the electric machine 300, shown in FIG. 3, may be included in the electric machine 202, illustrated in FIG. 2 or vice versa.

The electric machine 300 includes a rotor carrier 302 and a rotor hub 304. A splined interface 306 is formed between the rotor carrier 302 and the rotor hub 304. The splined interface 306 includes a plurality of mated splines 308. The rotor hub 304 is designed to allow for rotor rotation in the electric machine 300. The rotor hub 304 includes a body 309 extending towards and coupled to the rotor bearing 310. In one particular example, the rotor bearing 310 may be coupled to the rotor hub's body via an outer race. However, other coupling schemes may be used, in other examples.

A lash reducing spring 312 is positioned between a set of two adjacent splines in the splined interface 306. The lash reducing spring 312 is designed to exert forces on adjacent splines in the interface to reduce lash in the interface. Specifically, in one example, the forces may have tangential components to facilitate lash reduction. Furthermore, the lash reducing spring 312 may be preloaded when placed between the splines in the splined interface 306. In this way, the lash between the resolver and the rotor may be reduced (e.g., removed). In one example, the preload may be selected based on the expected forces on the spline during machine operation. For example, the preload may be larger than the expected forces, in one example. The spring 312 may be designed with a selected amount of preload for reducing lash between splines in the interface. Reducing spline lash increases machine durability and therefore longevity. Additionally, reducing lash in the splined interface also increases accuracy of the machine's sensor signals, such as resolver signals. As a result, machine operation may be improved because more accurate resolver signals can be used to control the stator's electromagnetic (EM) modulation. Specifically, in one example, the accurate resolver signals may be used to increase the machine's operational efficiency.

The electric machine 300 is also shown including a retaining ring 314 axially delimiting legs in the lash reducing spring 312. In this way, the lash reducing spring 312 may be kept in a desired location during machine operation. It will be appreciated that a section of the retaining ring 314 is omitted to reveal the underlying splined interface 306, in FIG. 3. However, the retaining ring may extend over a greater portion of the splined interface, than is depicted, in other instances. In one specific example, the retaining ring may circumferentially extend 360° around the splined interface.

The rotor bearing 310 is shown including races 316 and roller elements 318 (e.g., cylindrical bearings, spherical bearings, conical bearings, etc.) The electric machine 300 also includes a resolver armature 320 in a resolver. The resolver may function to generate machine velocity feedback for a control loop and give position information to commutate the machine, for example. However, resolver's with additional or alternate functionalities have been envisioned.

References axes 350 are provided in FIGS. 3-8 for reference. In one example, the z-axis may be a vertical axis (e.g., an axis parallel to a gravitational axis), the x-axis may be a horizontal axis, and the y-axis may be a longitudinal axis. However, other orientations of the axes have been contemplated. Additionally, FIGS. 3-4 show a rotational axis 352 about which the rotor carrier 302 and other components in the electric machine 300 rotate, for reference.

FIG. 4 shows a detailed view of the splined interface 306 in the electric machine 300. Again, the lash reducing spring 312 is shown positioned in the splined interface 306 formed between the rotor carrier 302 and a rotor hub 304.

Each of the splines 308 in the interface 306 includes an outer face 400 and two side faces 402. The splined interface 306 also includes recesses 404 mated with corresponding splines. Each of the recesses 404 include an inner face 406 and two side faces 408. The faces in the splines and the recesses have a planar profile, in the illustrated example. However, non-planar face profiles have been envisioned, for at least a portion of the faces in the recesses and/or the splines. For example, some of the faces may have a convex and/or concave shape. It will be appreciated that mated faces in the splines and recesses may have a corresponding shape.

In one example, the splines 308 in each of the rotor carrier 302 and the rotor hub 304 may be substantially identical in profile such that they correspondingly mate. In other examples, however, the splines in the rotor carrier 302 and the rotor hub 304 may include different sets of splines with different profiles.

The splines 409 in contact (e.g., face sharing contact) with the lash reducing spring 312 may have a different shape than the other splines in the splined interface. Specifically, the splines 409 include faces (e.g., radial aligned faces) contacting outer surfaces of legs 410 of the lash reducing spring 312. However, in other examples, the splines 409 may have a similar profile to other splines in the interface.

Furthermore, a gap 412 may be formed between the adjacent splines 409 in the splined interface 306 to accommodate for placement of the spring there between and allow the spring to be compactly packaged in the machine.

The splines contacting the spring 312 may also have other contours that accommodate space efficient integration of the spring 312 into the interface, discussed in greater detail herein with regard to FIG. 5.

FIG. 4 also shows the retaining ring 314. However, as in other illustrations of the electric machine a portion of the retaining ring is omitted to reveal underlying components such as the splined interface, the lash reducing spring, etc. As previously discussed, the retaining ring 314 helps axially retain the spring 312 in a desired location.

Figure 8:
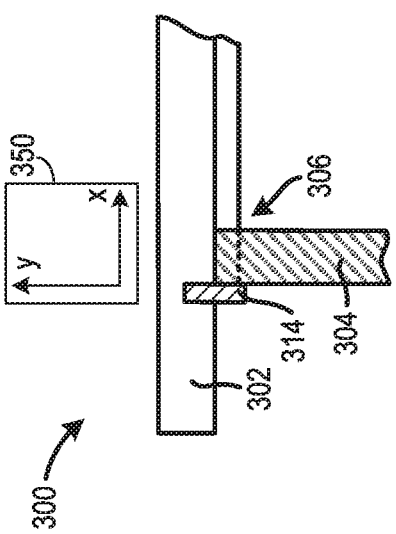

A viewing plane 450 indicating the viewing direction of the cross-sectional view shown in FIG. 5, is indicated in FIG. 4. Additionally, a viewing plane 452 indicates the viewing direction of the cross-sectional view shown in FIG. 8, is illustrated in FIG. 4.

FIG. 5 shows a detailed a cross-sectional view of the lash reducing spring 312 placed between a spline 500 in the rotor hub 304 and an adjacent spline 502 in the rotor carrier 302.

The lash reducing spring 312 includes the legs 410 connected via a bridge 504. The profile, thickness, material construction of the bridge 504 affect the preloading generated by the spring. As such, the aforementioned spring characteristics may be tuned to set the spring's preload.

The legs 410 include feet 508 extending into recesses 510 in the rotor hub 304 and the rotor carrier 302. The recesses 510 have a "stepped" shape in the illustrated cross-section shown in FIG. 5. However, the recesses may have other shapes, in other examples.

The spring 312 is shown axially extending across the gap 412 formed between the splines 500 and 502. However, in other examples, the spring 312 may only partially extend across the gap 412, resulting in a more compact configuration.

Arrows 514 depict a direction of the lash reducing forces generated by the spring 312. In this way, the clearance between the splines in the interface may be reduced. In other words, the play in the interface during machine operation is diminished. Therefore, in one example, the force may have a tangential component. It will be appreciated that the direction of the tangential component may be delineated relative to the rotational axis 352, shown in FIGS. 3-4. However, it will be appreciated, that the force may have additional or alternative components. Thus, in some examples, the spring force vectors may have additional complexity that is not illustrated. FIG. 5 illustrates a viewing plane 550 indicating the viewing direction of the cross-sectional view depicted, in FIG. 7.

The spring 312 shown in FIG. 5 is depicted as a hair pin style spring. However, numerous suitable types of springs have been envisioned such as torsional springs, helical springs, elastomeric springs, leaf springs, etc.

FIG. 6 shows another example of a lash reducing spring 600. Again the lash reducing spring 600 is shown including legs 602 positioned between and exerting a force on adjacent splines 604 in the splined interface 606 formed between a rotor hub 608 and a rotor carrier 610. As such, redundant description of similar features, structures, etc., of the spring 600, shown in FIG. 6, with the spring 312, shown in FIG. 5, are omitted for brevity.

As shown, the lash reducing spring 600 includes protrusions 612 extending from the legs 602. The protrusions 612 function to axially delimit the spring with regard to an axial direction extending towards a torque converter (now shown). As such, spring may be more securely held in place when it is designed with protrusions. However, numerous suitable spring contours have been considered. A retaining ring 616 is also shown in FIG. 6 again functioning to retain the spring 600 in a desired position.

Figure 7:
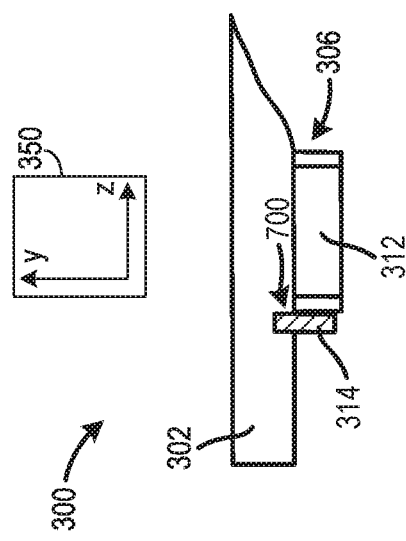
FIGS. 7-8 show different cross-sectional views of the splined interface, depicted in FIG. 4.

FIGS. 7-8 show different cross-sectional view of different regions of the electric machine 300 shown in FIG. 3. Specifically, FIG. 7 shows another cross-sectional view of the splined interface 306 in a location where the lash reducing spring 312 is positioned. FIG. 7 shows the retaining ring 314 positioned in a recess 700 of the rotor carrier 302. The retaining ring 314 is also shown axially delimiting the spring 312 in an axial direction extending toward the engine crankshaft (not shown).

FIG. 8 shows yet another cross-sectional view of the splined interface 306. As shown, the retaining ring 314 limits the axial movement of the rotor hub 304. The rotor carrier 302 is also shown in FIG. 8 forming the splined interface 306 with the rotor hub 304. The rotor carrier 302 is shown including a section positioned radially outward from and axially extending beyond the rotor hub 304 in a direction extending toward the engine crankshaft (not shown).

In this way, the rotor carrier 302 may be efficiently packaged with the rotor hub 304. However, other relative positions of the rotor hub and carrier may be used, in other examples.

FIG. 9 shows another embodiment of a splined interface 900. It will be appreciated that the features (e.g., structural or functional features) of the splined interface 900 may be incorporated into other electric machines described herein such as the electric machine 202, depicted in FIG. 2, or the electric machine 300, depicted in FIGS. 3-5, for example.

The splined interface 900 is illustrated at a higher level with regard to structural detail than is depicted in other embodiments of the splined interface. However, it will be appreciated that the splined interface 900 may include the more granular structural details, illustrated and described in the other splined interface embodiments.

FIG. 9 is illustrates a relative position of a first lash reducing spring 902 and a second lash reducing spring 904 in the splined interface 900. The first and second lash reducing springs, 902 and 904, are positioned on radially opposing sides 906 of the splined interface 900, in the depicted example. In particular, the first and second lash reducing springs may be positioned approximately 180 degrees apart with regard to a rotational axis 908 of the electric machine in which the splined interface 900 is incorporated. In this way, rotational loads caused by rotor hub imbalance may be reduced, thereby reducing stresses on the rotor bearing. Consequently, rotor bearing and more generally machine longevity may be increased. However, in other examples, the lash reducing spring may have different radial positions about the rotational axis.

In other embodiments, the electric machine may include additional lash reducing spring such as a third and a fourth lash reducing spring that again may be positioned on other radially opposing sides of the splined interface. Therefore, in such an example, each spring may be radially separated by approximately 45 degrees. It will be appreciated that each lash reducing spring may be designed with similar preloads, in one example. Continuing with such an example, the preloading of each spring may be less than the preload generated by the spring in the embodiment including a single lash reducing spring. For instance, whether the machine includes a single spring or multiple spring, the single spring or plurality of springs, in sum, may exert a target lash reducing preload force on the splined interface. As such, when multiple lash reducing springs are utilized the springs may be downsized and therefore may be more compact, thereby decreasing the machine's profile. However, machines where the springs are not downsized when multiple springs are used to increase the lash reducing preload, have been contemplated.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 10 shows a method 1000 for operating an electric machine in a driveline system. The method 1000 may be implemented via the driveline systems, electric machines, etc., described above with regard to FIGS. 1-9. However, in other examples, the method may be used to manufacture other suitable driveline systems. Instructions for carrying out method 1000 may be executed by a controller based on instructions stored on memory of the controller.

At 1002, the method includes rotating the electric machine. In one example, rotating the electric machine may include augmenting electrical input to a stator in the electric machine to induce rotation of a rotor. Additionally or alternatively, rotating the electric machine may include transferring rotational energy from an engine crankshaft to the rotor. Further, in one example, rotating the electric machine may include transferring rotational energy from the electric machine to a torque converter.

At 1004, the method includes applying a first lash reducing force on a splined interface formed between a rotor carrier and a rotor hub in the electric machine via a first lash reducing spring. However, other splined interfaces in the electric machines may receive the lash reducing force, in other examples.

At 1006, the method includes applying a second lash reducing force on the splined interface via a second lash reducing spring. The first and second lash reducing springs may be positioned on radially opposing sides of the splined interface, to rotationally balance the rotor. As such, loading on the bearing caused by unbalanced rotation of the rotor may be reduced, to improve electric machine operation.

The method is also shown including steps for gathering a sensor signal and adjusting operation of the electric machine based on the sensor signal. Therefore, at 1008, the method includes sending a sensor signal from a sensor coupled to the rotor hub to an electric machine controller. Next at 1010, the method includes augmenting electric machine operation based on the sensor signal. For instance, control signals sent to the stator may augmented to improve the efficiency of the EM interaction between the rotor and the stator. To elaborate, by reducing lash in the splined interface, the accuracy of the resolver signal is increased. The more accurate resolver signal may then be used to increase the efficiency of the electric machine during both power and electricity generating modes by accurately controlling electromagnetic operation in the machine. In turn, vehicle efficiency may be increased. However, in other examples steps 1008-1010 may be omitted from the method.

The technical effect of providing a lash reducing spring in a splined interface of an electric machine is to reduce lash in rotational components in the machine. Reducing lash in the electric machine increases the accuracy of signals generated by sensors coupled to or otherwise integrated into the machine to increase machine efficiency, for example. Reducing lash in the splined interface may also increase machine longevity by, for example, reducing impacts between the splines.

The invention will be further described in the following paragraphs. In one aspect, an electric machine is provided that includes a first rotational component; a second rotational component engaging the first rotational component via a splined interface; and a first lash reducing spring radially positioned between a first set of two adjacent splines in the splined interface.

In another aspect, a method for operating an electric machine is provided that comprises exerting a first lash reducing force on a splined interface formed between a rotor carrier and a rotor hub via a first lash reducing spring positioned between a first set of two adjacent splines in the splined interface; where the electric machine is selectively rotationally coupled to a torque converter. The method may further comprise, in one example, sending a sensor signal to an electric machine controller from a sensor coupled the rotor hub; and augmenting electric machine operation based on the sensor signal sent from the sensor to the electric machine controller. Additionally, the method may further comprise, in one example, exerting a second lash reducing force on the splined interface via a second lash reducing spring positioned between a second set of two adjacent splines in the splined interface. Further, in one example, exerting the first lash reducing force on the splined interface may include exerting tangential forces on faces of the two adjacent splines.

In another aspect, an electric machine is provided that comprises a rotor carrier; a rotor hub engaging the rotor carrier via a splined interface including a plurality of mated splines; and a first lash reducing spring positioned between a first set two adjacent splines in the plurality of mated splines in the splined interface; where the first lash reducing spring includes two legs axially extending through a gap formed between the first set of two adjacent splines.

In any of the aspects or combinations of the aspects, the two legs of the first lash reducing spring may be each in face sharing contact with a radial face of the corresponding spline.

In any of the aspects or combinations of the aspects, the two legs of the first lash reducing spring may exert tangential forces on the first set of two adjacent splines.

In any of the aspects or combinations of the aspects, the first rotational component may be a rotor carrier coupled to a rotor.

In any of the aspects or combinations of the aspects, the second rotational component may be a rotor hub coupled to a rotor bearing designed to enable rotation of the rotor carrier.

In any of the aspects or combinations of the aspects, the electric machine may further comprise a torque converter drive plate rotationally coupling the rotor carrier to a torque converter.

In any of the aspects or combinations of the aspects, the electric machine may further comprise a retaining ring positioned on a first axial side of the splined interface.

In any of the aspects or combinations of the aspects, the retaining ring may axial delimit a first and a second leg flange in the first lash reducing spring.

In any of the aspects or combinations of the aspects, the electric machine may further comprise a second lash reducing spring positioned between a second set of two adjacent splines in the splined interface.

In any of the aspects or combinations of the aspects, the second lash reducing spring and the first lash reducing spring are positioned on radially opposing sides of the splined interface.

In any of the aspects or combinations of the aspects, the electric machine may further comprise a second lash reducing spring positioned between a second set of two adjacent splines in the splined interface and where the first and the second lash springs are positioned on radially opposing sides of the splined interface.

In any of the aspects or combinations of the aspects, the electric machine may further comprise a resolver coupled to the rotor hub and designed to send signals to an electric machine controller.

In any of the aspects or combinations of the aspects, the electric machine may be selectively rotationally coupled to a torque converter in a hybrid vehicle.

In any of the aspects or combinations of the aspects, the electric machine may be included in a hybrid vehicle.

In any of the aspects or combinations of the aspects, the sensor may be a resolver.

In any of the aspects or combinations of the aspects, the first lash reducing spring and the second lash reducing spring may be positioned on radially opposing sides of the splined interface.

In any of the aspects or combinations of the aspects, where the lash reducing spring is a hairpin spring.

In any of the aspects or combinations of the aspects, where the electric machine is included in a hybrid vehicle.

In another representation, a spring is positioned in a joint between rotationally interfacing components in an electric motor, where the spring exerts forces on faces of the joint delimiting the spring to reduce lash in the joint.

In yet another representation, a spring is positioned in overlapping region between a rotor carrier and a rotor hub in an electric machine. The overlapping region includes extensions and recesses mated with one another and a gap formed between a sequential extension and a recess to radially accommodate the spring. The spring is designed to exert a lash reducing force on the sequential extension and the recess.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine, comprising:
a rotor carrier coupled to a rotor, where the rotor interacts with a stator to generate rotational energy in a drive mode;
a rotor hub engaging the rotor carrier via a splined interface; and
a first lash reducing spring radially positioned between a first set of two adjacent splines in the splined interface.

2. The electric machine of claim 1, further comprising a torque converter drive plate rotationally coupling the rotor carrier to a torque converter.

3. The electric machine of claim 1, further comprising a retaining ring positioned on a first axial side of the splined interface.

4. The electric machine of claim 3, where the retaining ring axial delimits a first leg and a second leg in the first lash reducing spring.

5. The electric machine of claim 1, further comprising a second lash reducing spring positioned between a second set of two adjacent splines in the splined interface.

6. The electric machine of claim 5, where the second lash reducing spring and the first lash reducing spring are positioned on radially opposing sides of the splined interface.

7. A method for operating an electric machine, comprising:
exerting a first lash reducing force on a splined interface formed between a rotor carrier and a rotor hub via a first lash reducing spring positioned between a first set of two adjacent splines in the splined interface, where the rotor carrier rotationally supports a rotor and the rotor electromagnetically interacts with a stator to generate rotational energy in a drive mode;
where the electric machine is selectively rotationally coupled to a torque converter.

8. The method of claim 7, further comprising:
sending a sensor signal to an electric machine controller from a sensor coupled the rotor hub; and
augmenting operation of the electric machine based on the sensor signal sent from the sensor to the electric machine controller.

9. The method of claim 8, where the sensor is a resolver.

10. The method of claim 7, further comprising exerting a second lash reducing force on the splined interface via a second lash reducing spring positioned between a second set of two adjacent splines in the splined interface.

11. The method of claim 10, where the first lash reducing spring and the second lash reducing spring are positioned on radially opposing sides of the splined interface.

12. The method of claim 7, where exerting the first lash reducing force on the splined interface includes exerting tangential forces on faces of the two adjacent splines.

13. An electric machine, comprising:
a rotor carrier;
a rotor hub engaging the rotor carrier via a splined interface including a plurality of mated splines; and
a first lash reducing spring positioned between a first set of two adjacent splines in the plurality of mated splines in the splined interface;
where the first lash reducing spring includes two legs axially extending through a gap formed between the first set of two adjacent splines; and
where the two legs of the first lash reducing spring are each in face sharing contact with a radial face of one of the two adjacent splines in the first set of two adjacent splines.

14. The electric machine of claim 13, where the two legs of the first lash reducing spring exert tangential forces on the first set of two adjacent splines.

15. The electric machine of claim 13, further comprising a second lash reducing spring positioned between a second set of two adjacent splines in the splined interface and where the first and the second lash springs are positioned on radially opposing sides of the splined interface.

16. The electric machine of claim 13, further comprising a resolver coupled to the rotor hub and designed to send signals to an electric machine controller.

17. The electric machine of claim 13, where the electric machine is selectively rotationally coupled to a torque converter in a hybrid vehicle.

* * * * *